(12) United States Patent
Kato et al.

(10) Patent No.: US 6,498,874 B1
(45) Date of Patent: Dec. 24, 2002

(54) OPTICAL TRANSMISSION LINE

(75) Inventors: Takatoshi Kato, Yokohama (JP); Eisuke Sasaoka, Yokohama (JP); Masayuki Nishimura, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 394 days.

(21) Appl. No.: 09/599,265

(22) Filed: Jun. 22, 2000

Related U.S. Application Data

(63) Continuation-in-part of application No. PCT/JP98/05465, filed on Dec. 3, 1998.

(30) Foreign Application Priority Data

Dec. 22, 1997 (JP) .............................................. 9-353153

(51) Int. Cl.⁷ ................................................ G02B 6/18
(52) U.S. Cl. .......................... 385/29; 385/124; 385/126
(58) Field of Search ............................ 385/29, 123–128

(56) References Cited

U.S. PATENT DOCUMENTS

| | | | |
|---|---|---|---|
| 3,785,718 A | * 1/1974 | Gloge | 385/124 |
| 3,944,811 A | * 3/1976 | Midwinter | 250/227.11 |
| 5,553,185 A | 9/1996 | Antos et al. | |
| 5,613,027 A | 3/1997 | Bhagavatula | |
| 5,838,867 A | * 11/1998 | Onishi et al. | 385/123 |
| 5,852,701 A | * 12/1998 | Kato et al. | 385/127 |
| 6,445,864 B2 | * 9/2002 | Jiang et al. | 385/127 |

FOREIGN PATENT DOCUMENTS

| | | | |
|---|---|---|---|
| EP | 0 724 171 | 7/1996 | |
| JP | 53-81136 | 7/1978 | |
| JP | 55034564 A | * 3/1980 | ............ H04B/9/00 |
| JP | 55106408 A | * 8/1980 | ........... G02B/5/172 |
| JP | 62-8605 | 2/1987 | |
| JP | 01232229 A | * 9/1989 | .......... G01M/11/02 |
| JP | 7-270636 | 10/1995 | |
| JP | 8-234036 | 9/1996 | |
| JP | 8-304655 | 11/1996 | |
| JP | 9-159856 | 6/1997 | |
| JP | 9-288220 | 11/1997 | |

OTHER PUBLICATIONS

Kato et al., "Design Optimization of Dispersion Shifted Fiber for WDM Transmission Considering Length Dependence of Cutoff Wavelength", Jul. 1996, pp. 160–161.

* cited by examiner

*Primary Examiner*—John D. Lee
*Assistant Examiner*—Sarah U Song
(74) *Attorney, Agent, or Firm*—McDermott, Will & Emery

(57) ABSTRACT

This invention relates to an optical transmission line having a structure that reduces dispersion with respect to signal light in a 1.55-$\mu$m band. Each transmission unit includes a dispersion-shifted optical fiber as a transmission medium and a mode removing unit for reducing the optical power of high-order modes excluding a fundamental mode of light signals propagating through the dispersion-shifted optical fiber. The dispersion-shifted optical fiber has an incident terminal on which the light signals are incident and an exit terminal from which the light signals are emitted, and has a cutoff wavelength longer than the wavelength of the light signals at a fiber length of 2 m. The mode removing unit has a structure for reducing the optical power of high-order modes to 1/10 or less, preferably 1/40 or less, of the optical power of the fundamental mode so as to satisfy the single-mode condition in relation to fiber length.

11 Claims, 9 Drawing Sheets

OPTICAL TRANSMISSION LINE

RELATED APPLICATIONS

This is a Continuation-In-Part application of International Patent application Ser. No. PCT/JP98/05465 filed on Dec. 3, 1998, now WO 99/32909.

BACKGROUND OF THE INVENTION

1. Field of the Invention

The present invention relates to an optical transmission line for transmitting light signals by using an optical fiber.

2. Related Background Art

WDM (Wavelength Division Multiplexing) transmission using an optical fiber network allows large-capacity, high-speed information transmission using WDM signals containing a plurality of wavelength components. As a transmission medium applied to this WDM transmission, an optical fiber having an effective area large enough to suppress the occurrence of a nonlinear phenomenon is preferable. An optical fiber serving as such a transmission medium is designed to have a small dispersion in terms of absolute value and a small dispersion slope in a 1.5-$\mu$m band, which is the wavelength range of the WDM signals, so as to reduce the accumulated wavelength dispersion (to be referred to as dispersion hereinafter) of the WDM signals (see, for example, Japanese Patent Laid Open Nos. 8-234036 and 8-304655). In addition, an optical fiber susceptible to the adverse influence of bending easily causes the increase of transmission loss by manufacturing cable. For this reason, the optical fiber preferably has a low bending loss.

A nonlinear phenomenon means as a phenomenon in which a signal light pulse is distorted in proportion to the density of light intensity or the like owing to an optical phenomenon such as FWM (four-wave mixing), SPM (self-phase modulation), or XPM (cross-phase modulation). This phenomenon becomes a factor that imposes a limitation on transmission speed or repeater intervals in a repeater transmission system. Dispersion means as a phenomenon in which a pulse wave broadens because the propagation speed of light varies with wavelength. A dispersion slope is defined as the slope of a curve representing dispersion characteristics in a predetermined wavelength range.

SUMMARY OF THE INVENTION

The present inventors have found the following problem upon studying an optical fiber applied to a conventional optical transmission line.

In general, in an optical fiber designed to have a large effective area and a small dispersion in terms of absolute value, the bending loss is high. In order to decrease the bending loss, the cutoff wavelength must be increased. A cutoff wavelength longer than those of the light signals can be set by using the distance dependence of cutoff wavelength (e.g., T. Kato, et al., OECC'96, 17C3-4). In this case, however, mode coupling from a fundamental mode to high-order modes occurs at the node or the like between optical fibers, and a deterioration in transmission characteristics is caused by mode-dispersion. This also imposes a limitation on an increase in cutoff wavelength.

It has been difficult to design an optical fiber that can satisfy all the requirements, i.e., a large effective area, a smaller dispersion in terms of absolute value, and a low bending loss. In other words, an optical transmission line has not been realized yet, which can suppress the occurrence of a nonlinear phenomenon and dispersion with respect to all wavelength components contained in WDM signals and is resistant to bending (is not easily affected by the overall transmission characteristics).

The present invention has been made to solve the above problem, and has as its object to provide an optical transmission line having a structure which has a small dispersion and excellent transmission characteristics in optical transmission in a 1.5-$\mu$m band and is suitable to WDM transmission.

An optical transmission line according to the present invention is provided at least between a transmitter and a receiver, between a transmitter and a repeater, between repeaters, or between a repeater and a receiver, and functions to transmit light signals containing one or more wavelength components. The optical transmission line according to the present invention comprises at least one transmission unit.

This transmission unit comprises: a dispersion-shifted optical fiber having an incident terminal on which light signals are incident, an exit terminal from which the light signals are emitted, and a cutoff wavelength longer than those of the light signals at a fiber length of 2 m, and a mode removing unit for reducing the optical power of high-order modes excluding a fundamental mode by an amount larger than transmission loss of high-order modes when the light signals propagate from a first portion to a second portion of the dispersion-shifted optical fiber.

Note that the first portion of the dispersion-shifted optical fiber corresponds to the incident portion of the mode removing unit, and the second portion of the dispersion-shifted optical fiber corresponds to the exit portion of the mode removing unit. The mode removing unit functions to satisfy the single-mode condition in optical transmission without using the distance dependence of cutoff wavelength in order to effectively reduce high-order modes.

The above dispersion-shifted optical fiber may be obtained by optically connecting a plurality of dispersion-shifted optical fibers to each other. In this case, the optical transmission line according to the present invention includes a plurality of transmission units. Each transmission unit comprises a dispersion-shifted optical fiber as a transmission medium and a mode removing unit associated therewith. Note that the mode removing unit prepared for each transmission unit may include a plurality of mode removing devices for removing high-order modes. These mode removing devices function as a whole to remove high-order modes propagating through the associated dispersion-shifted optical fibers.

In the optical transmission line according to the present invention, the above mode removing unit is arranged closer to the incident terminal side than the center of the dispersion-shifted optical fiber in the longitudinal direction of the dispersion-shifted optical fiber, and more preferably arranged near the incident terminal of the dispersion-shifted optical fiber. The exit terminal of another optical component, e.g., a dispersion-shifted optical fiber, optical fiber for transmission, or transceiver, is optically connected to the incident terminal of the above dispersion-shifted optical fiber. A position near the incident terminal therefore means a position immediately after the node between the exit terminal of another optical component and the incident terminal of the dispersion-shifted optical fiber. The dispersion-shifted optical fiber applied to the optical transmission line, in particular, has a cutoff wavelength longer than those of the light signals to reduce the bending loss. In order to ensure the single-mode condition, therefore, the mode removing unit is preferably positioned near the incident terminal of the dispersion-shifted optical fiber. When a plurality of dispersion-shifted optical fibers are optically connected to each other, mode-dispersion is likely to occur because optical power is exchanged between the fundamental mode and high-order modes at each node. In this case, coupling from high-order modes to the fundamental mode (the occurrence of mode-dispersion) can be effectively suppressed by removing high-order modes immediately after the node, and the propagation of high-order modes can also be suppressed. Note that coupling from the fundamental mode to high-order modes indicates that the transmission loss apparently increases.

The dispersion-shifted optical fiber applied to the optical transmission line according to the present invention has a cutoff wavelength longer than those of the light signals to reduce the bending loss. For this reason, in consideration of the distance dependence of cutoff wavelength as well, the single-mode condition is not satisfied near the incident terminal of the dispersion-shifted optical fiber. Reducing high-order modes is indispensable to satisfying the single-mode condition. Note that a cutoff wavelength that provides a single-mode condition in optical transmission is given by a wavelength set when $R(\lambda)$ defined by the method of measuring the cutoff wavelength (measuring it at a fiber length of 2 m) in ITU-TG. 650 becomes 0.1. Assume that light in a 1.55-μm band as a signal wavelength range (light having a wavelength of 1,550 nm which is the central wavelength in this range, in particular) is to be transmitted. In this case, to satisfy the single-mode condition at the exit portion of the mode removing unit ($R(1550\ nm)=0.1$), the mode removing unit must reduce the optical power of high-order modes to 1/40 or less of that of the fundamental mode at least at the exit portion of the unit. Note, however, that the dispersion-shifted optical fiber applied to the optical transmission line according to the present invention is much longer than a fiber length of 2 m that defines $R(\lambda)$, and hence a range of about 1/10 ($R(1550\ nm) \leq 0.4$) or less is allowed as a range in which transmission quality is not substantially affected, in consideration of the distance dependence of cutoff wavelength.

In order to reduce the optical power of high-order modes to 1/10 or less or 1/40 or less of the optical power of the fundamental mode, the mode removing unit preferably has a structure for winding a predetermined portion of a dispersion-shifted optical fiber with a diameter of 10 mm or more but 60 mm or less. Alternatively, the mode removing unit may have a structure for making a predetermined portion of a dispersion-shifted optical fiber meander with a radius of curvature of 5 mm or more. With this structure, high-order modes are greatly reduced, and the influences of high-order modes propagating through the dispersion-shifted optical fiber can be effectively reduced.

In order to effectively suppress a nonlinear phenomenon and implement wavelength division multiplexing transmission and soliton transmission as described above, a dispersion-shifted optical fiber that can be applied to the optical transmission line according to the present invention preferably has an effective area of 50 μm² or more with respect to light having a wavelength of 1,550 nm, a bending loss of 0.5 dB/turn or less at a diameter of 32 mm, and a cutoff wavelength of 2.0 μm or more at a fiber length of 2 m. More preferably, the dispersion-shifted optical fiber according to the present invention has a dispersion slope of 0.04 ps/nm²/km or less with respect to light having a wavelength of 1,550 nm.

In order to obtain the above characteristics, in a dispersion-shifted optical fiber having a core region extending along a predetermined axis and a cladding region provided on the outer periphery of the core region, the core region may include a first core having a predetermined refractive index, a second core provided on the outer periphery of the first core and having a refractive index lower than that of the first core, and a third core provided on the outer periphery of the second core and having a refractive index higher than that of the second core. The cladding region may include an inner cladding provided on the outer periphery of the third core of the core region and having a refractive index lower than that of the third core, and an outer cladding provided on the outer periphery of the inner cladding and having a refractive index higher than that of the inner cladding. The dispersion-shifted optical fiber may include a core region having the above structure and a cladding region having the above structure.

As disclosed in Japanese Patent Laid Open No. 8-248251 (EP 0 724 171 A2), an effective area ($A_{eff}$) is given by $$A_{eff}=2\pi(\int_0^\infty E^2 r dr)^2/(\int_0^\infty E^4 r dr) \qquad (1)$$

where E is the electric field accompanying light propagating, and r is the distance from the core center in the radial direction.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

Figure 1A:
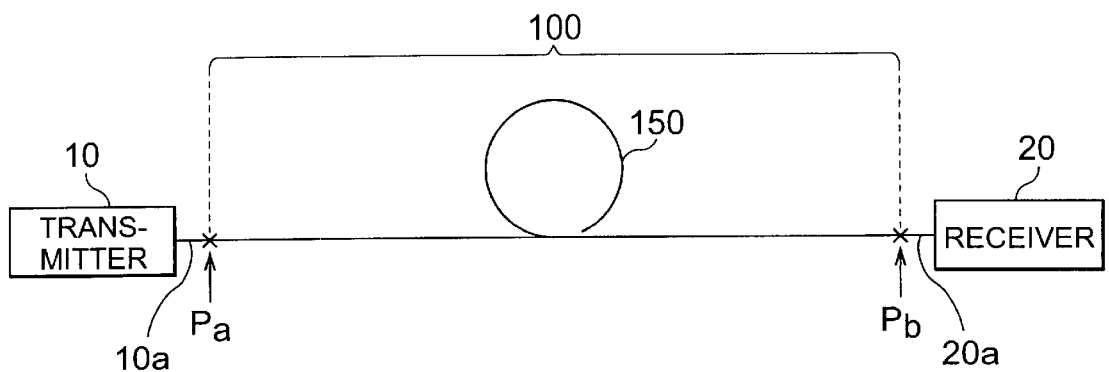
FIG. 1A is a view for explaining how a transmission medium included in a transmission unit is laid in the first embodiment of an optical transmission line according to the present invention.

Each embodiment of an optical transmission line according to the present invention will be described below with reference to FIGS. 1A to 4B, 5, 6, 7A to 9B, 10, and 11. Note that the same reference numerals denote the same parts throughout the drawings, and a repetitive description will be voided.

As a transmission medium for an optical transmission line, a dispersion-shifted optical fiber is used, which is designed to have a cutoff wavelength longer than those of light signals at a fiber length of 2 m as well as having a large effective area and a small absolute value of dispersion. In the dispersion-shifted optical fiber to be used, although the bending loss decreases owing to the long cutoff wavelength, more high-order modes (modes other than the fundamental mode) occur. In the optical transmission line according to the present invention, therefore, a mode removing unit is provided at a predetermined portion to effectively remove high-order modes that have occurred. The connection form of the transmission medium (dispersion-shifted optical fiber) in the optical transmission line, the arrangement of the mode removing unit, and the composition (refractive index profile) of the transmission medium can be variously modified. Each embodiment will be described below.

First Embodiment

Figure 1B:
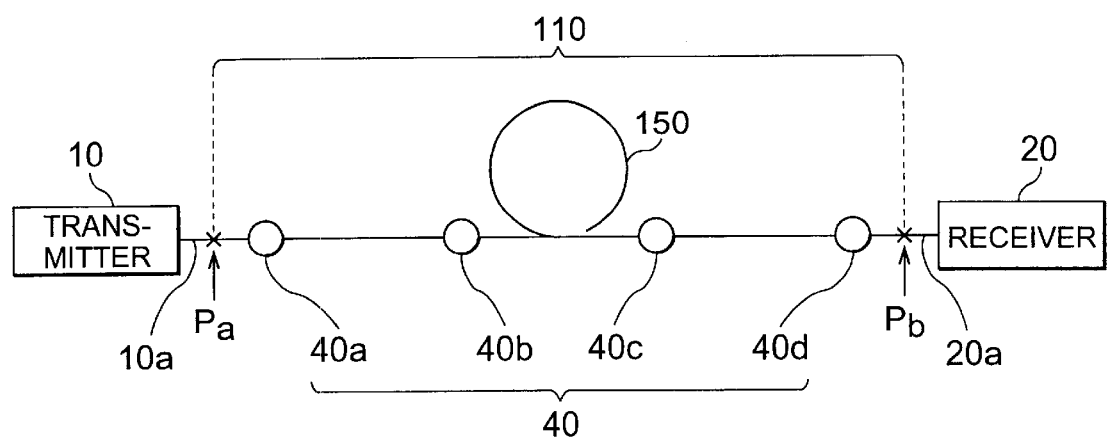
FIG. 1B is a view showing the arrangement of the first embodiment (including a signal transmission unit) of the optical transmission line according to the present invention.

In the first embodiment, a single transmission unit is placed between a transmitter and a receiver. FIG. 1A is a view for explaining how a dispersion-shifted optical fiber included in the transmission unit is provided. FIG. 1B shows the arrangement of the first embodiment (having a single transmission unit).

As shown in FIG. 1A, an optical transmission line 100 is basically configured to have a dispersion-shifted optical fiber 150 as a transmission medium placed between a transmitter 10 and a receiver 20. The incident terminal of the dispersion-shifted optical fiber 150 is optically connected to an exit terminal 10a of the control unit 10 at a node Pa. The exit terminal of the optical fiber 150 is optically connected to an incident terminal 20a of the receiver 20 at a node Pb.

As shown in FIG. 1B, the optical transmission line 100 comprises the single dispersion-shifted optical fiber 150 and a single transmission unit including a mode removing unit 40 placed on the dispersion-shifted optical fiber 150 (in the optical path between the points Pa and Pb). In this embodiment, the mode removing unit 40 includes a plurality of mode removing devices 40a to 40d arranged at predetermined portions of the dispersion-shifted optical fiber 150. These mode removing devices 40a to 40d remove high-order modes propagating through the dispersion-shifted optical fiber 150.

Preferably, the dispersion-shifted optical fiber 150 has dispersion whose absolute value is 10 ps/nm/km or less, more preferably 5 ps/nm/km or less with respect to light having a wavelength of 1,550 nm, and a cutoff wavelength longer than those of the light signals at a fiber length of 2 m.

The mode removing devices 40a to 40d included in the mode removing unit 40 reduce the optical power of high-order modes of light signals propagating through the dispersion-shifted optical fiber 150 to 1/10 or less, and preferably 1/40, of that of the fundamental mode. According to a measurement method complying with ITU-T G. 650, the cutoff wavelength at a fiber length of 2 m is given as a wavelength obtained when $R(\lambda)$ defined below becomes 0.1:

$$R(\lambda)=10\cdot\log(P1(\lambda)/P2(\lambda)) \qquad (2)$$

where $P1(\lambda)$ is the optical power (the sum of optical powers of the fundamental mode and high-order modes) of light passing through the optical fiber when it is bent with a diameter of 280 mm, and $P2(\lambda)$ is the optical power of light (substantially, most of the fundamental mode) passing through the optical fiber when it is bent with a diameter of 60 mm. Assume that the normalized power of the fundamental mode is 1, and the normalized power of high-order modes is x at the exit portion of the mode removing unit 40 (the exit portion of each mode removing device). In this case, in order to satisfy R (1,550 nm)=0.1 (single-mode condition) with respect to light having a wavelength of 1,550 nm (the central wavelength in the 1.5-$\mu$m band), the optical power x must fall within the range of 10·log(1+x)/1=0.1 to x=0.0233 (1≈1/40). Note, however, that a dispersion-shifted optical fiber to be actually laid is much longer than 2 m. In consideration of the distance dependence of cutoff wavelength, therefore, sufficiently good transmission quality can be ensured even with R (1,550 nm)=0.4 (x≈1/10) or so.

As described above, as the high-order mode reducing ability of the mode removing unit 40 applied to the optical transmission line according to the present invention, the ability of reducing the optical power of high-order modes to 1/10 or less, preferably 1/40 or less, of that of the fundamental mode is required.

In the first embodiment, light signals emitted from the exit terminal 10a of the transmitter 10 strike the incident terminal of the dispersion-shifted optical fiber 150 and propagate through the dispersion-shifted optical fiber 150 toward the mode removing device 40a. The mode removing device 40a removes high-order modes from the signal light immediately after they strike the dispersion-shifted optical fiber 150 (near the node Pa). However, part of the fundamental mode is coupled to high-order modes until the light signals reach the mode removing device 40b. The high-order modes are removed by the mode removing device 40b. As a consequence, the optical power of the high-order modes is reduced to at least 1/10 or less of the optical power of the fundamental mode near the exit portion of the mode removing device 40b.

The light signals emitted from the mode removing device 40b then propagate through the dispersion-shifted optical fiber 150 toward the mode removing device 40c on the next stage. Part of the fundamental mode is also coupled to high-order modes between the mode removing device 40b and the mode removing device 40c. Since the mode removing device 40c removes the high-order modes that have occurred as well, the optical power of high-order modes can be reduced to at least 1/10 or less of that of the fundamental mode at the exit portion of the mode removing device 40c. Subsequently, high-order modes are effectively removed by the mode removing device 40d.

The light signals emitted from the mode removing device 40d are received by the receiver 20 at the node Pb. At this time, there is a chance that part of the fundamental mode is further coupled to high-order modes while the light signals propagate through the dispersion-shifted optical fiber 150 until these reach the receiver 20 from the mode removing device 40d. When, however, the transmission distance between the mode removing device 40d and the receiver 20 is sufficiently short, most of the light signals reach the receiver 20 as a fundamental mode without an increase in the optical power of high-order modes.

In the first embodiment, since the dispersion-shifted optical fiber 150 has a dispersion of 10 ps/nm/km or less, more preferably 5 ps/nm/km or less in terms of absolute value with respect to a wavelength of 1,550 nm, the dispersion is small. In addition, since the cutoff wavelength of the dispersion-shifted optical fiber 150 at a fiber length of 2 m is larger than those of the light signals, the bending loss is low. Furthermore, since the cutoff wavelength of the dispersion-shifted optical fiber 150 is large at a fiber length of 2 m, and the single-mode condition is not satisfied, coupling from the fundamental mode of the light signals to high-order modes occurs. As described above, however, since the high-order modes are removed by the mode removing devices 40a to 40d provided at predetermined positions on the dispersion-shifted optical fiber 150, most of the light signals that reach the receiver 20 are the fundamental mode. According to the optical transmission line 100, a deterioration in transmission characteristics due to mode-dispersion can be suppressed.

Second Embodiment

Figure 2A:
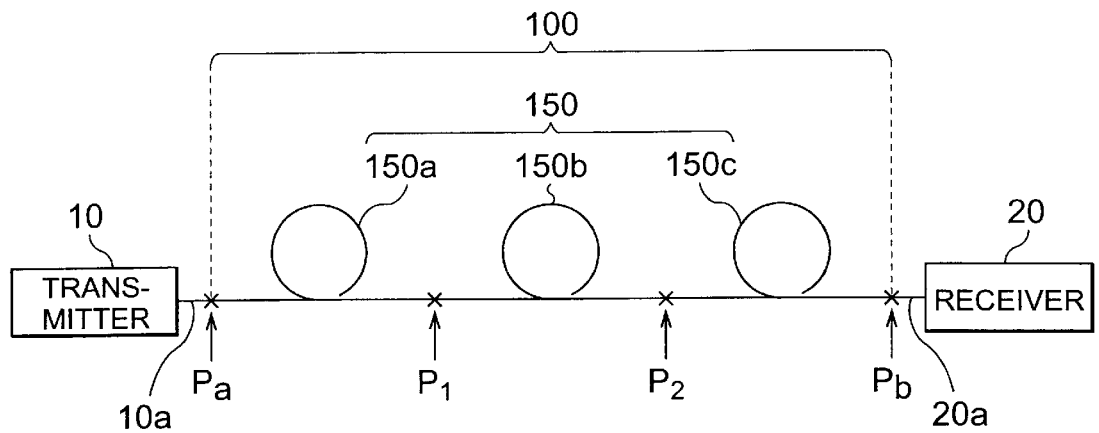
FIG. 2A is a view for explaining how a transmission medium included in a transmission unit is provided in the second embodiment of the optical transmission line according to the present invention.
Figure 2B:
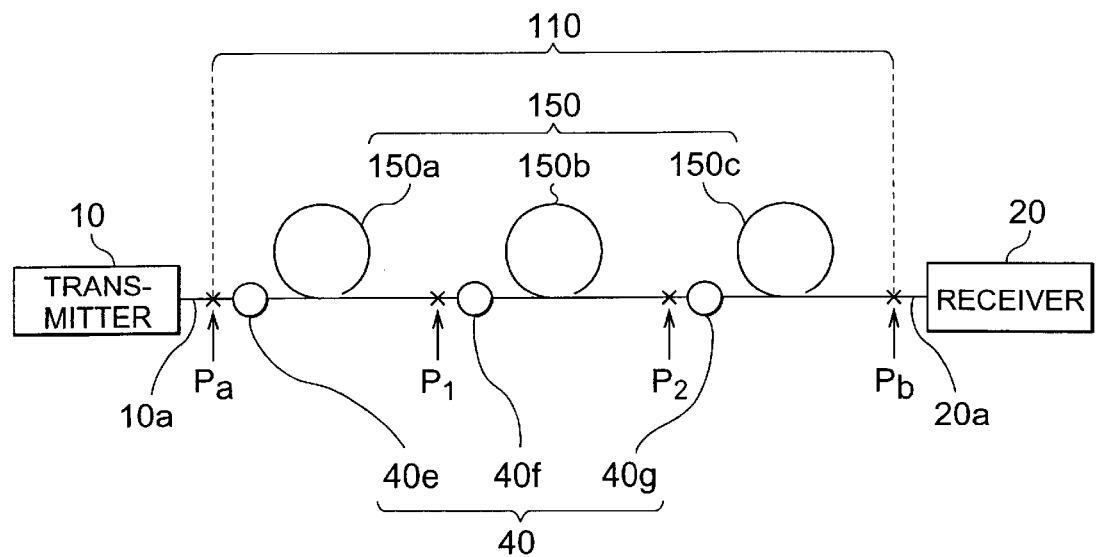
FIG. 2B is a view showing the arrangement of the first embodiment (including a plurality of transmission units) of the optical transmission line according to the present invention.

In the second embodiment, a plurality of transmission units are provided between a transmitter and a receiver. FIG. 2A is a view for explaining how transmission media included in the transmission unit are laid in the second embodiment of the optical transmission line of the present invention. FIG. 2B is a view showing the arrangement of the second embodiment of the optical transmission line of the present invention (having a plurality of transmission units).

As shown in FIG. 2A, in an optical transmission line 100, a dispersion-shifted optical fiber 150 as a transmission medium is provided between a transmitter 10 and a receiver 20. This transmission medium 150 has a plurality of dispersion-shifted optical fibers 150a, 150b, and 150c optically connected to each other at nodes P1 and P2. The transmission medium 150 constituted by the three dispersion-shifted optical fibers 150a, 150b, and 150c is optically connected to an exit terminal 10a of the transmitter 10 at a node Pa, and is also optically connected to an incident terminal 20a of the receiver 20 at a node Pb. As shown in FIG. 2B, the optical transmission line 100 comprises a first transmission unit constituted by a mode removing unit 40e corresponding to the dispersion-shifted optical fiber 150a, a second transmission unit constituted by a mode removing unit 40f corresponding to the dispersion-shifted optical fiber 150b, and a third transmission unit constituted by a mode removing unit 40g corresponding to the dispersion-shifted optical fiber 150c. Note that in the second embodiment, each of the mode removing units 40e to 40g may include a plurality of mode removing devices.

Each of the dispersion-shifted optical fibers 150a, 150b, and 150c has a dispersion of 10 ps/nm/km or less, more preferably 5 ps/nm/km or less in terms of absolute value at a wavelength of 1,550 nm, and a cutoff wavelength longer than those of the light signals at a fiber length of 2 m. Each of the mode removing units 40e, 40e, and 40g reduces the optical power of high-order modes of light signals propagating through a corresponding one of the dispersion-shifted optical fibers 150a, 150b, and 150c to 1/10 or less of the optical power of the fundamental mode. As described above, the optical power of high-order modes is preferably reduced to 1/40 or less of that of the fundamental mode.

In the second embodiment, light signals emitted from the transmitter 10 strike the incident terminal (node Pa) of the dispersion-shifted optical fiber 150a and propagate through the dispersion-shifted optical fiber 150a toward a node P1 (the exit terminal of the dispersion-shifted optical fiber 150a). At this time, the mode removing unit 40e removes high-order modes of the light signals immediately after they strike the dispersion-shifted optical fiber 150a (near the node Pa). However, part of the fundamental mode is coupled to high-order modes until the light signals reach the node P1. At the code P1 as well, coupling between the fundamental mode and high-order modes occurs. Since the high-order modes are removed by the mode removing unit 40f disposed near the incident terminal of the dispersion-shifted optical fiber 150b, the optical power of high-order modes of the light signals is at least 1/10 or less of that of the fundamental mode near the exit portion of the mode removing unit 40f.

Subsequently, the light signals emitted from the mode removing unit 40f propagate through the dispersion-shifted optical fiber 150b toward a node P2. At this time, the mode removing unit 40f removes high-order modes of the light signals immediately after they strike the dispersion-shifted optical fiber 150b (near the node P1). However, part of the fundamental mode is coupled to high-order modes until the light signals reach the node P2. In addition, coupling from the fundamental mode to high-order modes occurs. Since the high-order modes are removed by the mode removing unit 40g disposed near the incident terminal of the dispersion-shifted optical fiber 150c (near the node P2), the optical power of high-order modes of the light signals becomes at least 1/10 or less of the optical power of the fundamental mode near the exit portion of the mode removing unit 40g.

The light signals emitted from the mode removing unit 40g reach the receiver 20 through the node Pb. At this time, part of the fundamental mode propagating through the dispersion-shifted optical fiber 150c is also coupled to high-order modes, another mode removing unit is preferably disposed near the incident terminal of receiver 20 or the fiber length of the dispersion-shifted optical fiber 150c is preferably decreased. In this case, since the distance that the light signals propagate from the mode removing unit 40g to the receiver 20 is sufficiently short, most of the light signals reach the receiver 20 as the fundamental mode without an increase in the optical power of high-order modes.

In the second embodiment as well, each of the dispersion-shifted optical fibers 150a, 150b, and 150c as transmission media has a dispersion of 10 ps/nm/km or less, more preferably 5 ps/nm/km or less in terms of absolute value at a wavelength of 1,550 nm. The dispersion of the entire optical transmission line 100 can therefore be suppressed small. In addition, since each of the dispersion-shifted optical fibers 150a, 150b, and 150c has a cutoff wavelength longer than those of the light signals at a fiber length of 2 m, the bending loss is low. Since each of the dispersion-shifted optical fibers 150a, 150b, and 150c does not satisfy the single-mode condition at a fiber length of 2 m (the cutoff wavelength at a fiber length of 2 m is longer than those of the light signals), coupling from the fundamental mode of light signals to high-order modes occurs. As described above, however, since high-order modes are removed by the mode removing units 40e to 40g and 400, most of the light signals that reach the receiver 20 is the fundamental mode. That is, according to the second embodiment having a plurality of transmission units, a deterioration in transmission characteristics due to mode-dispersion can be suppressed.

Figure 3A:
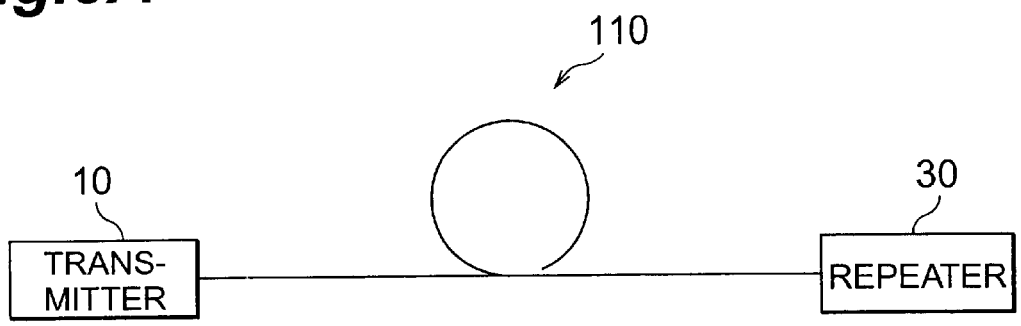
FIGS. 3A to 3C are views for explaining environments to which the optical transmission line according to the present invention is applied.
Figure 3B:
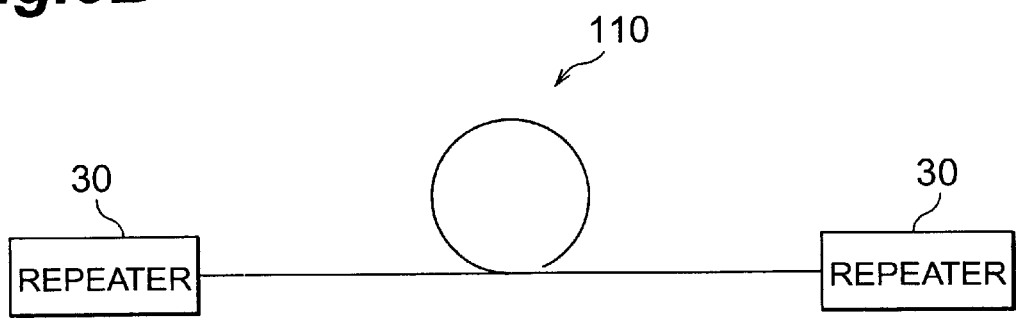
Figure 3C:
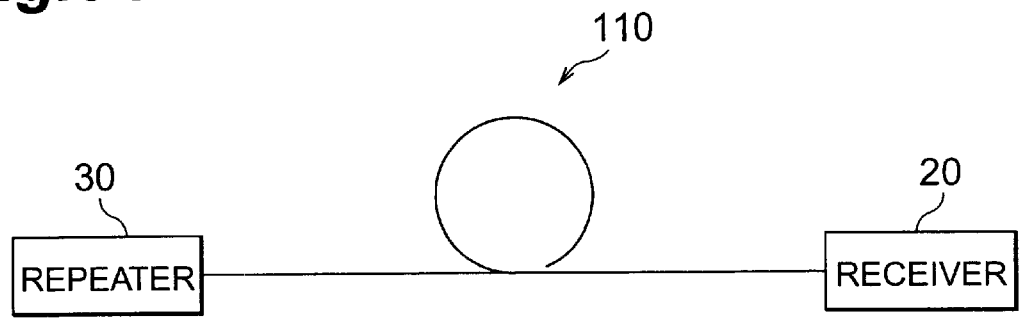

Each of the optical transmission lines 100 according to the first and second embodiments described above may be laid between the transmitter 10 and a repeater 30 as shown in FIG. 3A, between repeaters 30 as shown in FIG. 3B, and between the repeater 30 and the receiver 20 as shown in FIG. 3C, as well as between the transmitter 10 and the receiver 20. FIGS. 3A to 3C do not show the nodes between the exit terminal of the transmitter 10, the incident terminal of the receiver, and the optical transmission line 100.

Figure 4A:
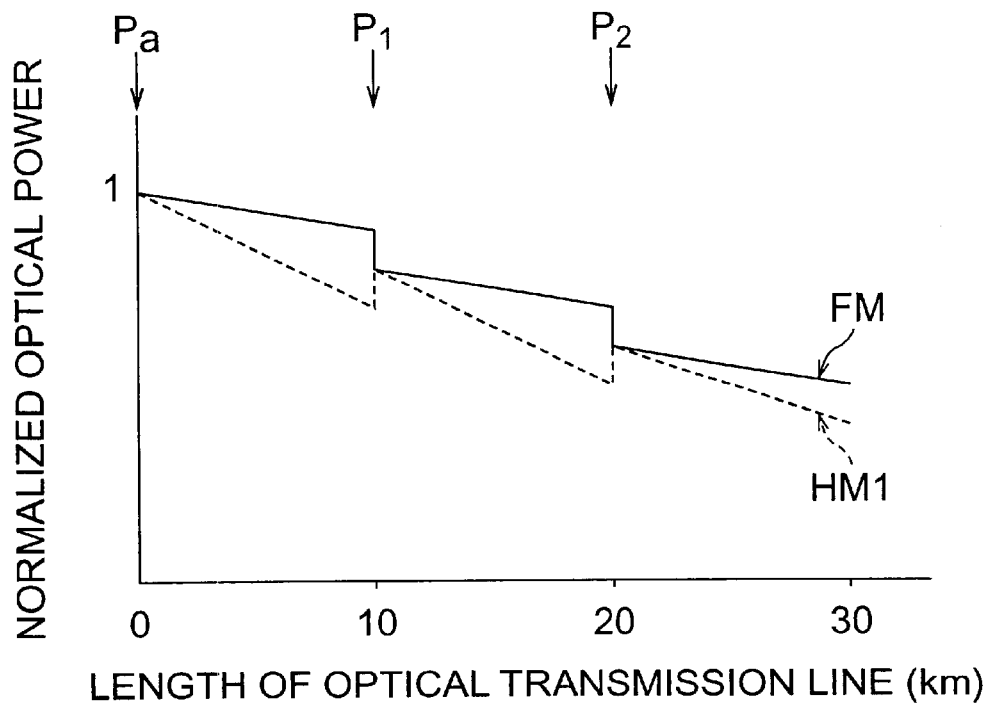
FIG. 4A is a graph for explaining the function of a conventional optical transmission line.
Figure 4B:
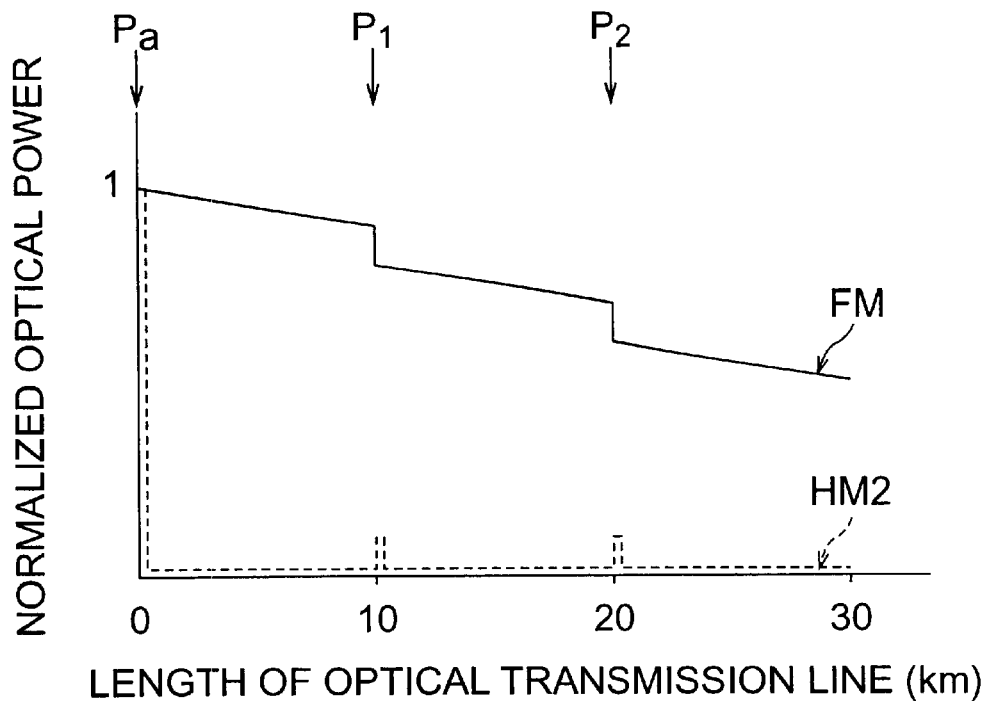
FIG. 4B is a graph for explaining the function of the optical transmission line according to the second embodiment in FIG. 2B.

In the second embodiment, FIG. 4A is a graph for explaining the function of a conventional optical transmission line, and FIG. 4B is a graph for explaining the function of the optical transmission line according to the second embodiment shown in FIG. 2B. In each of these graphs, the abscissa represents the optical transmission line length (km); and the ordinate, the optical power normalized with the power at the time of incidence being defined as 1. In addition, the optical transmission line corresponding to each graph is configured such that the transmission distance between the transmitter 10 and the receiver 20 is 30 km, three optical fibers, each having a length of 10 km, are connected in series, and the optical power of a fundamental mode incident on the first-stage dispersion-shifted optical fiber is equal to that of high-order modes.

As shown in FIG. 4A, in the conventional optical transmission line, coupling from the fundamental mode to high-order modes occurs during propagation of light through the optical fiber, and both the fundamental mode and high-order modes undergo transmission losses. As a consequence, the optical powers of both the fundamental mode and high-order modes decrease with an increase in propagation distance in the optical fiber. In addition, since coupling from the fundamental mode to high-order modes occurs at each of the nodes P1 and P2 between the respective optical fibers, the optical power of the fundamental mode decreases, and the optical power of high-order modes increases. In the conventional optical transmission line, the optical power of high-order modes at the position of the exit terminal of the last-stage optical fiber cannot be sufficiently reduced.

In contrast to this, as shown in FIG. 4B, in the optical transmission line according to the second embodiment, high-order modes incident on the first-stage optical fiber are quickly removed by the mode removing unit disposed near the incident terminal of the optical fiber, and the optical power of high-order modes is reduced to at least 1/10 or less of that of the fundamental mode. Although coupling from the fundamental mode to high-order modes occurs at each of the nodes P1 and P2 between the optical fibers, the optical power of high-order modes is reduced to at least 1/10 or less of the optical power of the fundamental mode by the mode removing unit disposed immediately after each node. obviously, therefore, in the optical transmission line according to the second embodiment, the optical power of high-order modes at the position of the exit terminal of the last-stage optical fiber is reduced greatly.

Mode Removing Unit

An embodiment of a mode removing unit 40 that can be applied to the first and second embodiments of the optical transmission line described above will be described in detail next.

Figure 5:
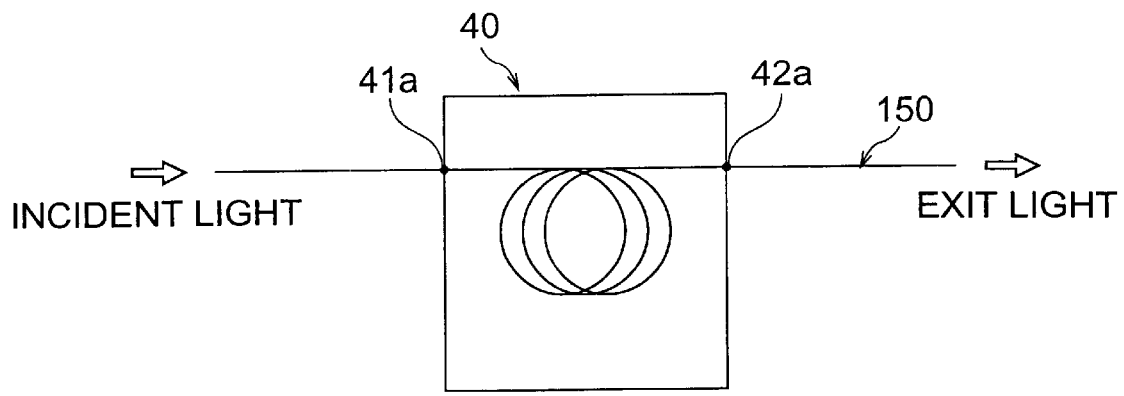
FIG. 5 is a view showing the first embodiment of a mode removing unit in the optical transmission line according to the present invention.

FIG. 5 shows the first embodiment of the mode removing unit 40 in the optical transmission line according to the present invention. In the first embodiment of the mode removing unit 40, that portion of a dispersion-shifted optical fiber 150 which is located between a first portion 41a and a second portion 42a is wound around a bobbin or the like which has a diameter of 10 mm or more but 60 mm or less. In the first embodiment of the mode removing unit 40, the first portion 41a of the dispersion-shifted optical fiber 150 corresponds to the incident portion of the mode removing unit 40, and the second portion 42a corresponding to the exit portion of the mode removing unit 40. The coil diameter of the dispersion-shifted optical fiber 150 is set to 10 mm or more to prevent the occurrence of bending loss with respect to the fundamental mode. This diameter is set to 60 mm or less to sufficiently increase bending loss with respect to high-order modes and prevent the number of turns from become too large. The number of turns is set such that the optical power of high-order modes becomes at least 1/10 or less of that of the fundamental mode.

Figure 6:
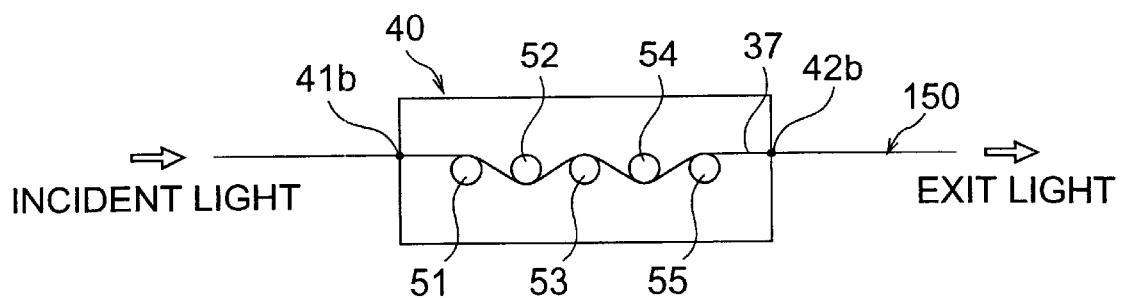
FIG. 6 is a view showing the second embodiment of the mode removing unit in the optical transmission line according to the present invention.

FIG. 6 shows the second embodiment of the mode removing unit 40 in the optical transmission line according to the present invention. In the second embodiment of the mode removing unit 40, that portion of a dispersion-shifted optical fiber 150 which is located between a first portion 41b and a second portion 42b of a dispersion-shifted optical fiber 150 is made to meander by using columnar members 51 to 55 which are disposed to be parallel to each other. In the second embodiment of the mode removing unit 40, a first portion 41b of the dispersion-shifted optical fiber 150 corresponds to the incident portion of the mode removing unit 40, and a second portion 42b corresponds to the exit portion of the mode removing unit 40. The radius of curvature of each bent portion is 5 mm or more. The radius of curvature is set to 5 mm or more to prevent the occurrence of bending loss with respect to the fundamental mode. The number of columnar members is set such that the optical power of high-order modes of light signals is reduced to at least 1/10 or less of the optical power of the fundamental mode.

Dispersion-Shifted Optical Fiber

Embodiments of the dispersion-shifted optical fiber 150 which can be applied to the first and second embodiments of the above optical transmission line will be described in detail next.

Figure 7A:
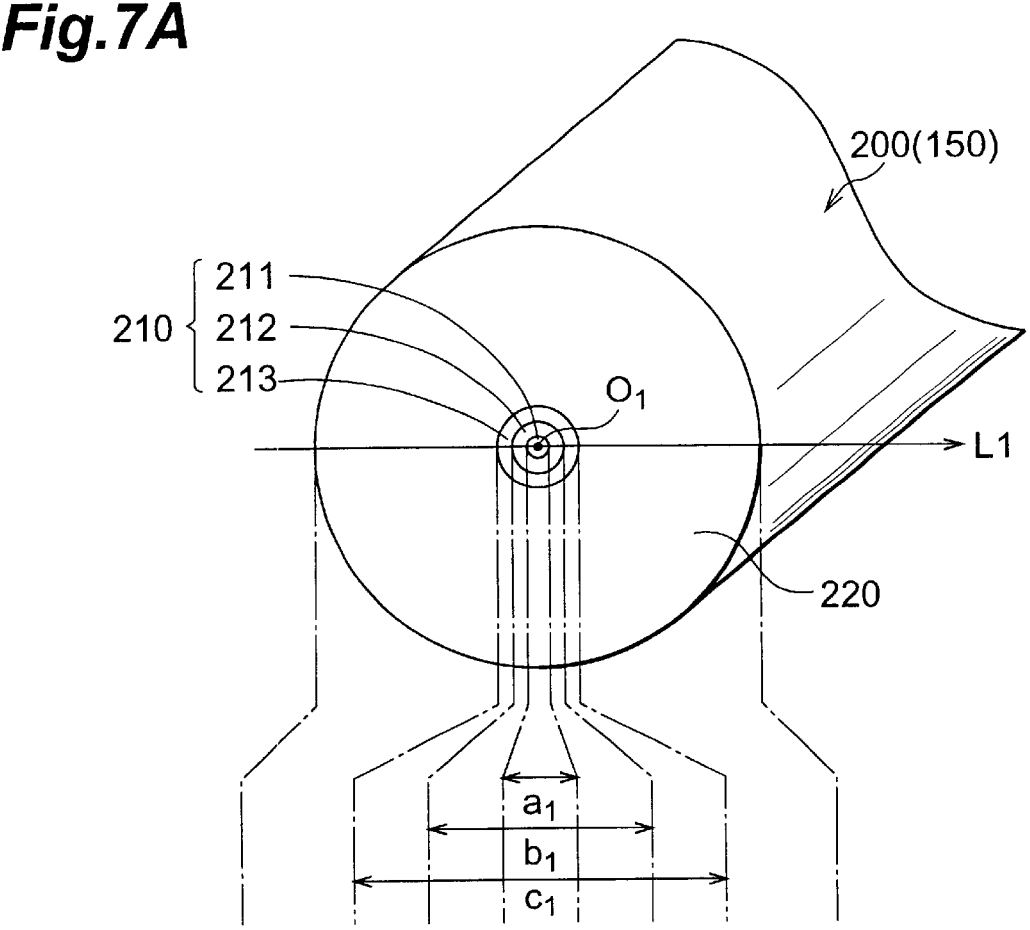
FIG. 7A is a view showing the sectional structure of the first embodiment of a dispersion-shifted optical fiber in the optical transmission line according to the present invention.
Figure 7B:
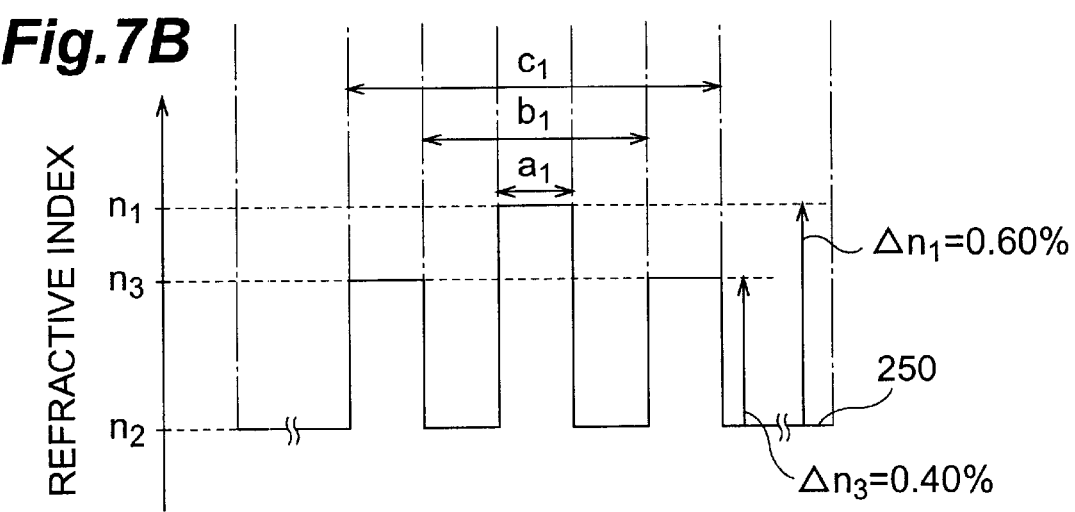
FIG. 7B is a view showing the refractive index profile of the dispersion-shifted optical fiber in FIG. 7A.

FIG. 7A shows the sectional structure of the first embodiment of the dispersion-shifted optical fiber in the optical transmission line according to the present invention. FIG. 7B shows the refractive index profile of the dispersion-shifted optical fiber shown in FIG. 7A.

A dispersion-shifted optical fiber 200 (corresponding to the dispersion-shifted optical fiber 150 shown in FIGS. 1A to 2B) comprises a core region 210 extending along a predetermined axis and a cladding region 220 provided on the outer periphery of the core region 210. The core region 210 comprises a first core 211 having a refractive index $n_1$ and an outer diameter a1, a second core 212 provided on the outer periphery of the first core 211 and having a refractive index $n_2$ (<$n_1$) and an outer diameter b1, and a third core 213 provided on the outer periphery of the second core 212 and having a refractive index $n_3$ (<n1, >$n_2$) and an outer diameter c1. The cladding region 220 provided on the outer periphery of the third core 213 has a refractive index $n_4$ (=$n_2$). Therefore, the relationship in magnitude between the refractive indexes of the respective regions is defined as $n_2=n_4<n_3<n_1$.

A refractive index profile 250 in FIG. 7B indicates the refractive index of each portion on a line L1 passing through a center $O_1$ of a cross-section of the dispersion-shifted optical fiber 200 in FIG. 7A.

More specifically, the outer diameter al of the first core 211 is 6 µm; the outer diameter b1 of the second core 212, 16.8 µm; the outer diameter c1 of the third core 213, 24 µm; and the outer diameter of the cladding region 220, 125 µm. With reference to the refractive index $n_4$ of the cladding region 220, a relative refractive index difference $\Delta n_1$ of the first core 211 is +0.6%, and a relative refractive index difference $\Delta n_3$ of the third core 213 is +0.4%. Note that a relative refractive index difference $\Delta n_i$ of each region i is given by $$\Delta n_i=(n_T-n_R)/n_R \quad (3)$$

where $n_R$ is the refractive index of a reference region (corresponding to the refractive index $n_4$ of the cladding region 220 in this case), and $n_T$ is the refractive index of the region i (corresponding to each of the refractive indexes $n_1$ to $n_3$ of the first to third cores 211 to 213 in this embodiment). In this specification, each relative refractive index difference is expressed in percentage. When a relative refractive index difference takes a negative value, it indicates that the refractive index of the region i is lower than the refractive index of the reference region.

When the properties of the dispersion-shifted optical fiber 200 having the above arrangement were measured, the dispersion value with respect to light having wavelength of 1,550 nm was −0.6 ps/nm/km, the dispersion slope, 0.02 ps/nm²; the bending loss with one turn with a diameter of 32 mm, 0.0002 dB; the effective area, 55 µm²; and the cutoff wavelength at a fiber length of 2 m, 2.74 µm.

Figure 8A:
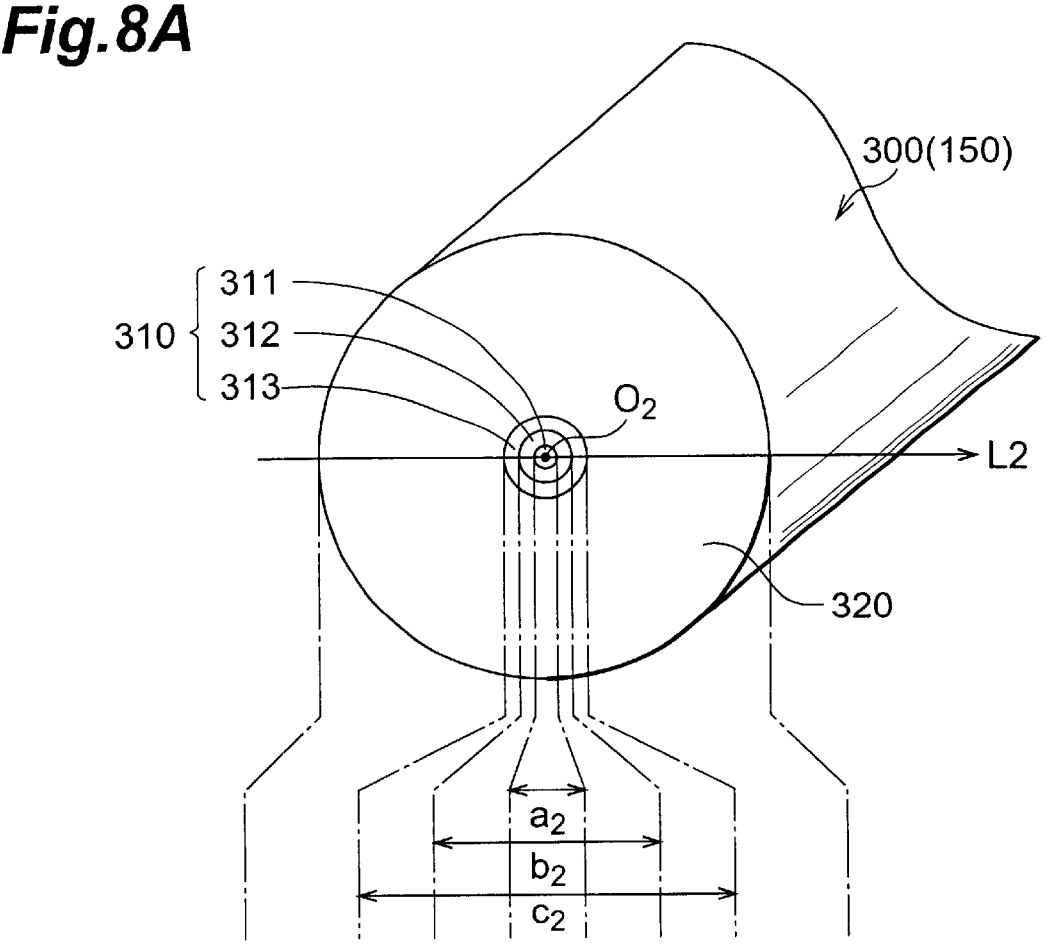
FIG. 8A is a view showing the sectional structure of the second embodiment of the dispersion-shifted optical fiber in the optical transmission line according to the present invention.
Figure 8B:
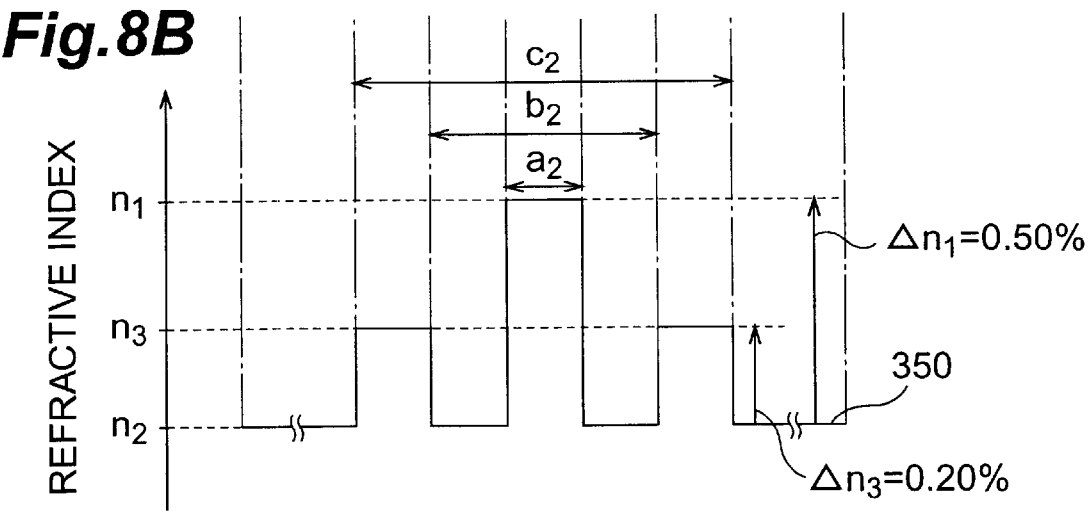
FIG. 8B is a view showing the refractive index profile of the dispersion-shifted optical fiber in FIG. 8A.

FIG. 8A shows the sectional structure of the second embodiment of the dispersion-shifted optical fiber in the optical transmission line according to the present invention. FIG. 8B shows the refractive index profile of the dispersion-shifted optical fiber in FIG. 8A.

A dispersion-shifted optical fiber 300 (corresponding to the dispersion-shifted optical fiber 150 shown in FIGS. 1A to 2B) comprises a core region 310 extending along a predetermined axis and a cladding region 320 provided on the outer periphery of the core region 310. The core region 310 comprises a first core 311 having a refractive index $n_1$, and an outer diameter a2, a second core 312 provided on the outer periphery of the first core 311 and having a refractive index $n_2$ (<$n_1$) and an outer diameter b2, and a third core 313 provided on the outer periphery of the second core 312 and having a refractive index $n_3$ (<$n_1$, >$n_2$) and an outer diameter c2. The cladding region 320 provided on the outer periphery of the third core 313 has a refractive index $n_4$ (=$n_2$). Therefore, the relationship in magnitude between the refractive indexes of the respective regions is defined as $n_2=n_4<n_3<n_1$.

A refractive index profile 350 in FIG. 8B indicates the refractive index of each portion on a line L2 passing through a center $O_2$ of a cross-section of the dispersion-shifted optical fiber 300 in FIG. 8A.

More specifically, the outer diameter a2 of the first core 311 is 5.32 µm; the outer diameter b2 of the second core 312, 18.6 µm; the outer diameter c2 of the third core 313, 26.6 µm; and the outer diameter of the cladding region 320, 125 µm. With reference to the refractive index $n_4$ of the cladding region 320, relative refractive index differences $\Delta n_1$, and $\Delta n_3$ of the first and third cores 311 and 313 are +0.5% and +0.2%, respectively, according to equation (3) given above.

When the properties of the dispersion-shifted optical fiber 300 having the above arrangement were measured, the dispersion value with respect to light having wavelength of 1,550 nm was −3.5 ps/nm/km, the dispersion slope, 0.033 ps/nm²; the bending loss with one turn with a diameter of 32 mm, 0.48 dB; the effective area, 67 µm²; and the cutoff wavelength at a fiber length of 2 m, 2.01 µm.

Figure 9A:
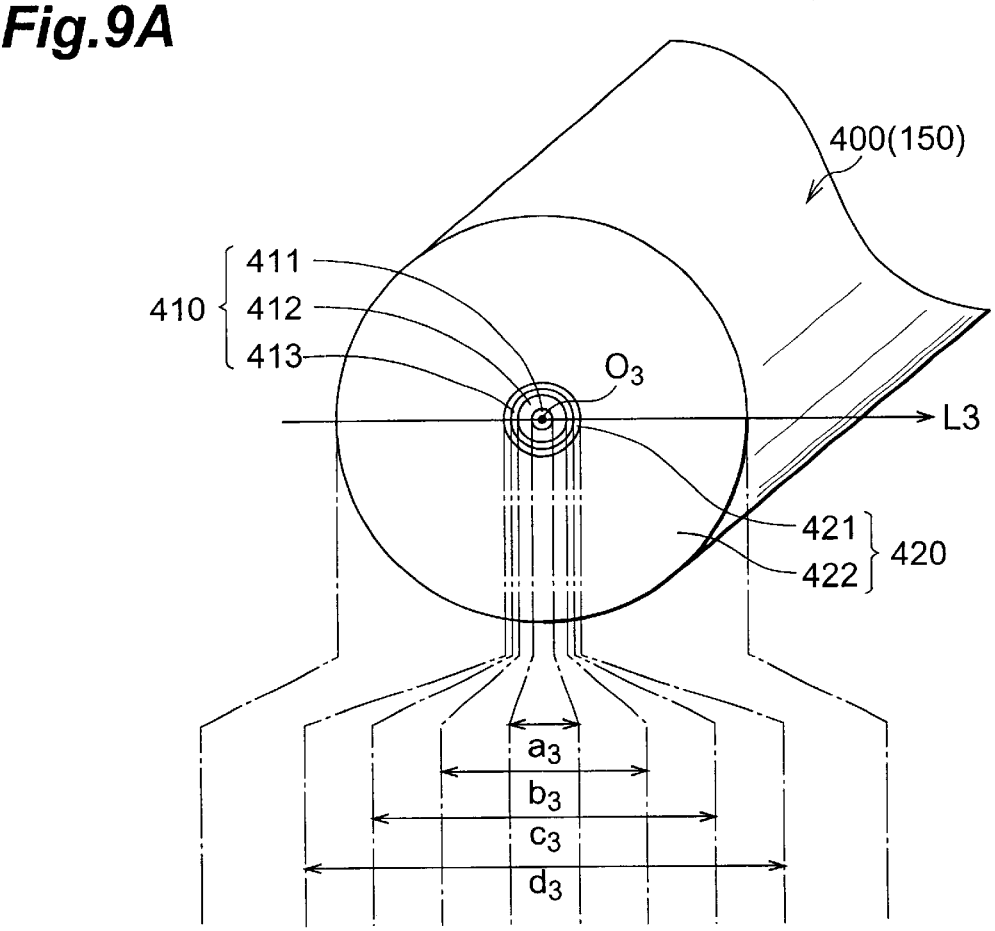
FIG. 9A is a view showing the sectional structure of the third embodiment of a dispersion-shifted optical fiber in the optical transmission line according to the present invention.
Figure 9B:
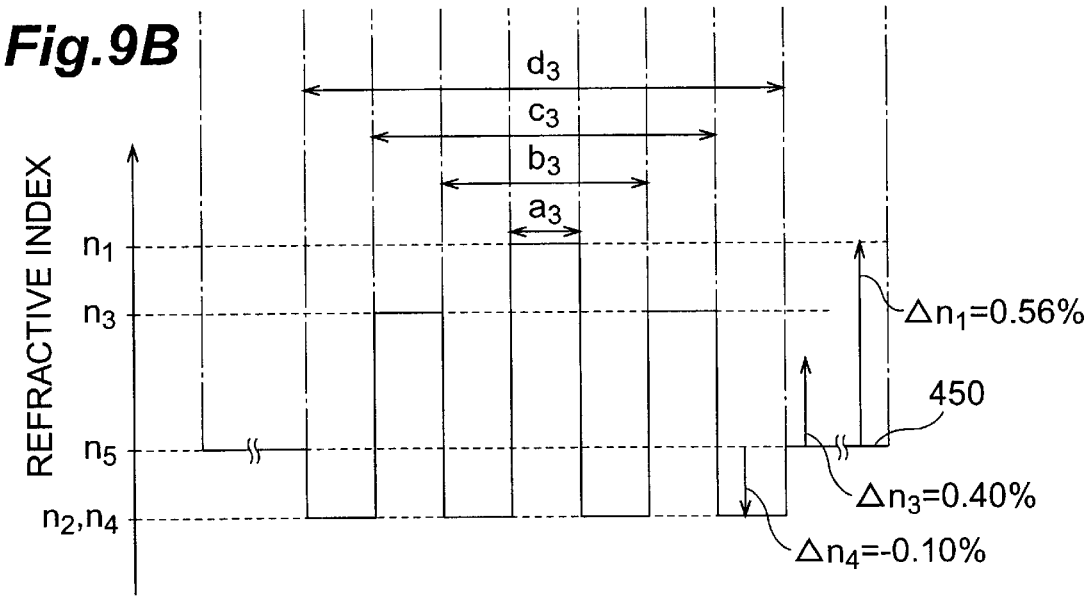
FIG. 9B is a view showing the refractive index profile of the dispersion-shifted optical fiber in FIG. 9A.

FIG. 9A shows the sectional structure of the third embodiment of the dispersion-shifted optical fiber in the optical transmission line according to the present invention. FIG. 9B shows the refractive index profile of the dispersion-shifted optical fiber in FIG. 9A.

A dispersion-shifted optical fiber 400 (corresponding to the dispersion-shifted optical fiber 150 shown in FIGS. 1A to 2B) comprises a core region 410 extending along a predetermined axis and a cladding region 420 provided on the outer periphery of the core region 410. The core region 410 comprises a first core 411 having a refractive index $n_1$, and an outer diameter a3, a second core 412 provided on the outer periphery of the first core 411 and having a refractive index $n_2$ (<$n_1$) and an outer diameter b3, and a third core 413 provided on the outer pheriphery of the second core 412 and having a refractive index $n_3$ (<$n_1$, >$n_2$) and an outer diameter c3. The cladding region 420 comprises an inner cladding 421 provided on the outer periphery of the third core 413 and having a refractive index $n_4$ (=$n_2$) and an outer diameter d3 and an outer cladding 422 provided on the outer periphery of the inner cladding 411 and having a refractive index $n_5$ (<$n_3$, >$n_2$). A depressed cladding structure is realized by the inner and outer claddings 421 and 422. Therefore, the relationship in magnitude between the refractive indexes of the respective regions is defined as $n_2=n_4<n_5<n_3<n_1$.

A refractive index profile 450 in FIG. 9B indicates the refractive index of each portion on a line L3 passing through a center $O_3$ of a cross-section of the dispersion-shifted optical fiber 400 in FIG. 9A.

More specifically, the outer diameter a3 of the first core 411 is 6.2 µm; the outer diameter b3 of the second core 412, 16.8 µm; the outer diameter c3 of the third core 413, 24.0 µm; the outer diameter d3 of the inner cladding 421, 48.0 µm; and the outer diameter of the inner cladding 422, 125 µm. With reference to the refractive index $n_5$ of the outer cladding 422, relative refractive index differences $\Delta n_1$, $\Delta n_2$, $\Delta n_3$, and $\Delta n_4$ of the first core 411, second core 412, third core 413, and inner cladding 421 are +0.56%, −0.10%, +0.40%, and −0.10%, respectively, according to equation (3) given above.

When the properties of the dispersion-shifted optical fiber 400 having the above arrangement were measured, the dispersion value with respect to light having wavelength of 1,550 nm was −0.8 ps/nm/km; the dispersion slope, 0.00 ps/nm²/km; the bending loss with one turn with a diameter of 32 mm, 0.0005 dB; the effective area, 53 µm²; and the cutoff wavelength at a fiber length of 2 m, 2.27 µm.

As described above, each of the dispersion-shifted optical fibers 200 to 400 shown in FIGS. 7A to 9B has a dispersion of 10 ps/nm/km or less, more preferably 5 ps/nm/km or less in terms of absolute value with respect to a wavelength of 1,550 nm, and a cutoff wavelength longer than the 1.5 µm band of light signals at a fiber length of 2 m. Each dispersion-shifted optical fiber can therefore be suitably applied to the optical transmission line 100 shown in FIGS. 1A to 2B. Each of the dispersion-shifted optical fibers 200 to 400 has an effective area of 50 $\mu m^2$ or more with respect to a wavelength of 1,550 nm, a bending loss of 0.5 dB or less with one turn with a diameter of 32 mm, a dispersion slope of 0.04 ps/nm$^2$/km or less, and a cutoff wavelength of 2.0 $\mu$m, and hence is suitable for wavelength division multiplexing transmission and soliton transmission.

Figure 10:
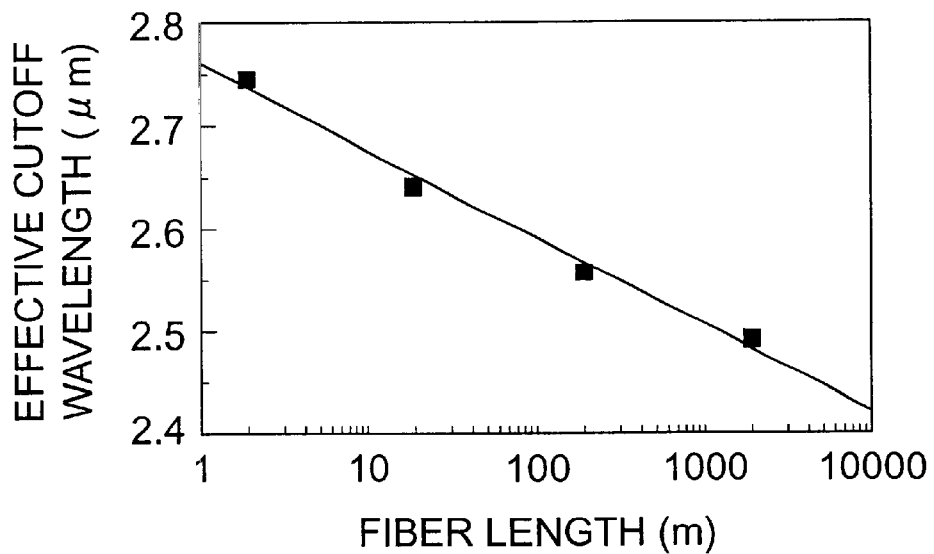
FIG. 10 is a graph showing the relationship between the effective cutoff wavelength and length of the dispersion-shifted optical fiber in FIGS. 7A and 7B.

FIG. 10 is a graph showing the relationship between the effective cutoff wavelength and fiber length of the receiver 20 shown in FIGS. 7A and 7B. As is obvious from this graph, the effective cutoff wavelength is 2.74 $\mu$m at a fiber length of 2 m and decreases as the fiber length increases. When, however, the fiber length is 10 km, the effective cutoff wavelength is about 2.43 $\mu$m, and light signals in a 1.55-$\mu$m band do not become a single mode.

Figure 11:
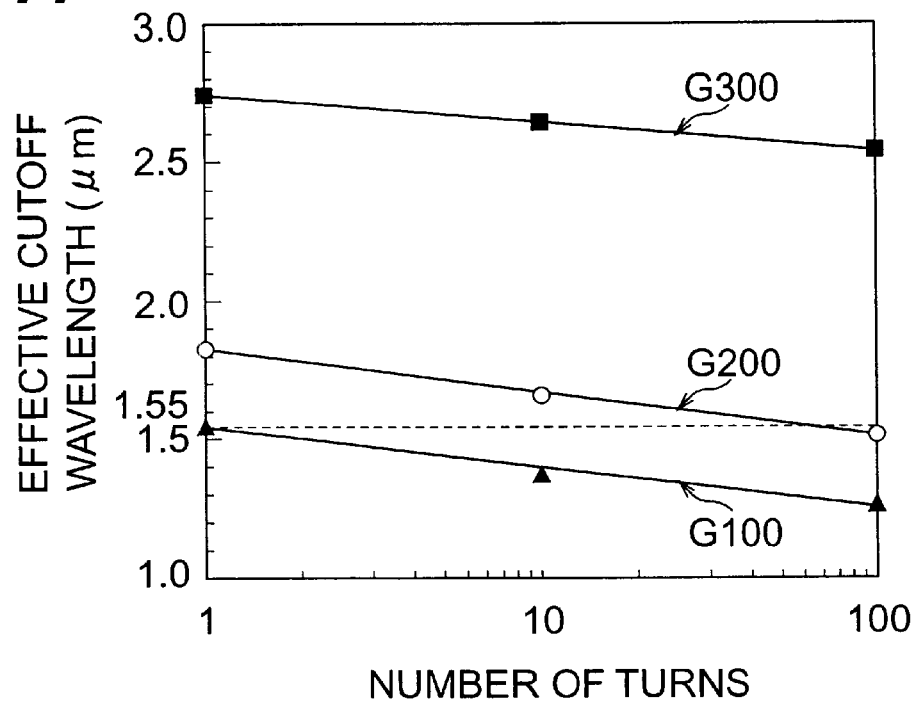
FIG. 11 is a graph showing the relationship between the effective cutoff wavelength and number of turns of the dispersion-shifted optical fiber in FIGS. 7A and 7B with respect to a plurality of coil diameters.

FIG. 11 is a graph showing the effective cutoff wavelength and number of turns of the dispersion-shifted optical fiber 200 shown in FIGS. 7A and 7B. Referring to this graph, reference symbol G100 denotes a measurement result at a coil diameter of 20 mm; G200, a measurement result at a coil diameter of 32 mm; and G300, a measurement result at a coil diameter of 280 mm. As is obvious from the graph, when the dispersion-shifted optical fiber 200 is wound twice with a coil diameter of 20 mm, the effective cutoff wavelength becomes 1.55 $\mu$m or less. As a consequence, high-order modes of light signals in a 1.55-$\mu$m band are reduced to ensure a single mode. In this case, the bending loss of the fundamental mode is about 0.002 dB, which is sufficiently low. That is, a mode removing unit can be realized. As is obvious from the relationships shown in FIGS. 10 and 11 as well, a mode removing unit disposed at a predetermined portion in a dispersion-shifted optical fiber as a transmission medium functions to satisfy the single-mode condition.

The present invention is not limited to the embodiments described above, and various modifications of the embodiments can be made. For example, the refractive index profiles shown in FIGS. 7B, 8B, and 9B are only examples. The present invention is not limited to them, and can take various forms.

As described in detail above, according to the present invention, light signals in a 1.55-$\mu$m band propagate through a dispersion-shifted optical fiber having a small mode-dispersion. In this case, part of the fundamental mode is coupled to high-order modes. The optical power of the high-order modes that have occurred is, however, reduced to 1/10 or less of that of the fundamental mode by a mode removing unit. An optical transmission line can therefore be obtained, which allows most of light signals to reach a receiver as the fundamental mode, has a small wavelength dispersion with respect to light signals in a 1.5-$\mu$m band and excellent transmission characteristics, and is suited to WDM transmission.

In addition, according to the present invention, a mode removing unit is disposed immediately after the node between a dispersion-shifted optical fiber and another optical component. With this arrangement, high-order modes genarated at the node between the dispersion-shifted optical fiber and another optical component, e.g., the node between the dispersion-shifted optical fiber and another transmission optical fiber or the like, are quickly removed by the mode removing means disposed immediately after the node. This makes it possible to effectively suppress the propagation of high-order modes and satisfy the single-mode condition with a shorter transmission distance.

The mode removing unit is obtained by winding a dispersion-shifted optical fiber as a transmission medium with a diameter of 10 mm or more but 60 mm or less, or by making a dispersion-shifted optical fiber as a transmission medium meander with a radius of curvature of 5 mm or more. With such an arrangement, the optical power of high-order modes can be reduced to 1/10 or less of that of the fundamental mode.

Furthermore, the dispersion-shifted optical fiber has an effective area of 50 $\mu m^2$ or more with respect to light having a wavelength of 1,550 nm, a bending loss of 0.5 dB or less at a diameter of 32 mm, a dispersion slope of 0.04 ps/nm$^2$/km or less, and a cutoff wavelength longer than those of the light signals at a fiber length of 2 m. This makes it possible to effectively suppress the occurrence of a nonlinear phenomenon and implement wavelength division multiplexing transmission and soliton transmission.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical transmission line including at least one transmission unit for transmitting light signals of one or more wavelength components, said transmission unit comprising:

a dispersion-shifted optical fiber having an incident terminal on which said light signals are incident and an exit terminal from which said light signals are emitted, said dispersion-shifted optical fiber having a cutoff wavelength longer than those of said light signals at a fiber length of 2 m; and a mode removing unit provided between first and second portions in said dispersion-shifted optical fiber, said mode removing unit having incident and exit portions respectively located at said first and second portions and reducing optical power of the high-order modes by an amount larger than transmission loss caused when said light signals propagate from said incident terminal to said exit terminal.

2. An optical transmission line according to claim 1, wherein said mode removing unit is arranged closer to said incident terminal thereof than a center of said dispersion-shifted optical fiber in a longitudinal direction of said dispersion-shifted optical fiber.

3. An optical transmission line according to claim 1 or 2, wherein said mode removing unit reduces the optical power of high-order modes to 1/10 or less of the optical power of a fundamental mode at said exit portion positioned at said second portion.

4. An optical transmission line according to claim 3, wherein said mode removing unit reduces the optical power of high-order modes to 1/40 or less of the optical power of a fundamental mode at said exit portion positioned at said second portion.

5. An optical transmission line according to claim 1, wherein said mode removing unit has a structure for winding a predetermined portion of said dispersion-shifted optical fiber with a diameter of 10 mm or more but 60 mm or less.

6. An optical transmission line according to claim 1, wherein said mode removing unit has a structure for making a predetermined portion of said dispersion-shifted optical fiber meander with a radius of curvature of 5 mm or more.

7. An optical transmission line according to claim 1, wherein said mode removing unit comprises a plurality of mode removing devices for reducing the optical power of high-order modes, each of said mode removing devices including an incident portion positioned at said first portion and an exit portion positioned at said second portion.

8. An optical transmission line according to claim 1, wherein said dispersion-shifted optical fiber has an effective area of 50 $\mu m^2$ or more with respect to light having a wavelength of 1,550 nm, a cutoff wavelength of 2.0 $\mu$m or more at a fiber length of 2 m, and a bending loss of 0.5 dB/turn or less with a diameter of 32 mm.

9. An optical transmission line according to claim 1, wherein said dispersion-shifted optical fiber has a dispersion slope of 0.04 ps/nm$^2$/km or less as a characteristic with respect to light having a wavelength of 1,550 nm.

10. An optical transmission line according to claim 1, wherein said dispersion-shifted optical fiber comprises a core region extending along a predetermined axis and a cladding region provided on the outer periphery of said core region, and wherein said core region comprises a first core having a predetermined refractive index, a second core provided on the outer periphery of said first core and having a refractive index lower than that of said first core, and a third core provided on the outer periphery of said second core and having a refractive index higher than that of said second core.

11. An optical transmission line according to claim 10, wherein said cladding region of said dispersion-shifted optical fiber comprises an inner cladding provided on the outer periphery of said third core of said core region and having a refractive index lower than that of said third core, and an outer cladding provided on the outer periphery of said inner cladding and having a refractive index higher than that of said inner cladding.

\* \* \* \* \*